Fig:1.

P. BURT.
INTERNAL COMBUSTION ENGINE.
APPLICATION FILED AUG. 3, 1910.

1,310,646.

Patented July 22, 1919.
4 SHEETS—SHEET 2.

WITNESSES
W. P. Burk
John C. Sanders

INVENTOR
Peter Burt
BY Wallau White
ATTY

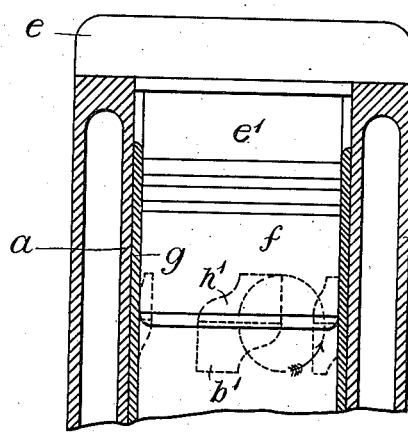
Fig:6.
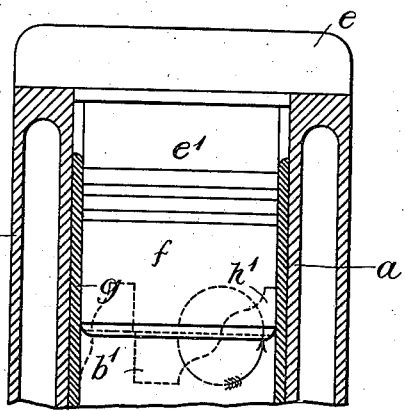
Fig:8.
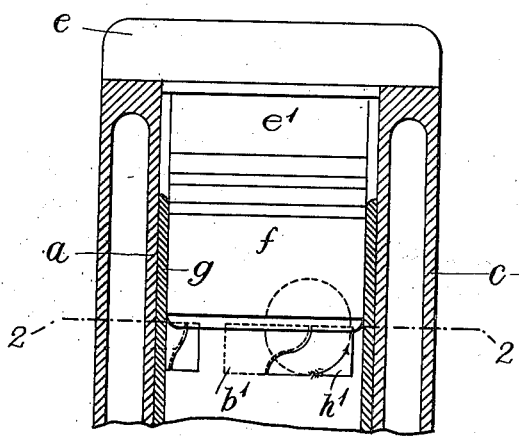
Fig:7.
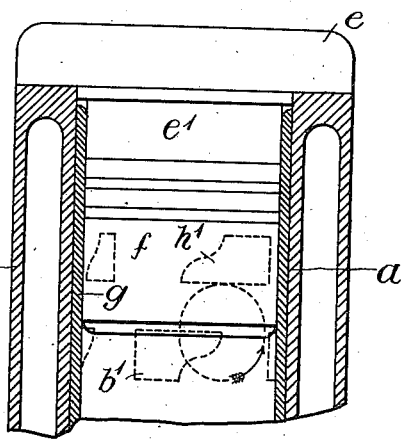
Fig:9.

P. BURT.
INTERNAL COMBUSTION ENGINE.
APPLICATION FILED AUG. 3, 1910.
1,310,646.
Patented July 22, 1919.
4 SHEETS—SHEET 4.
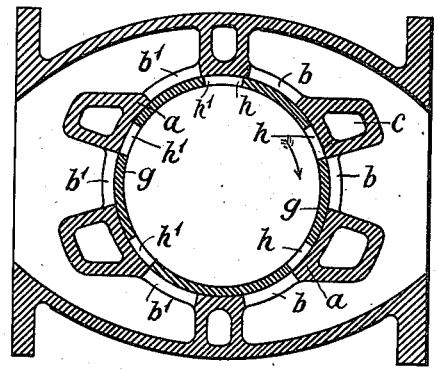
Fig: 10.
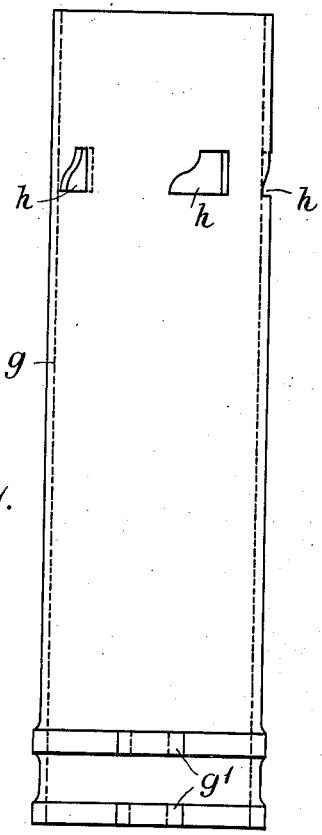
Fig: 11.
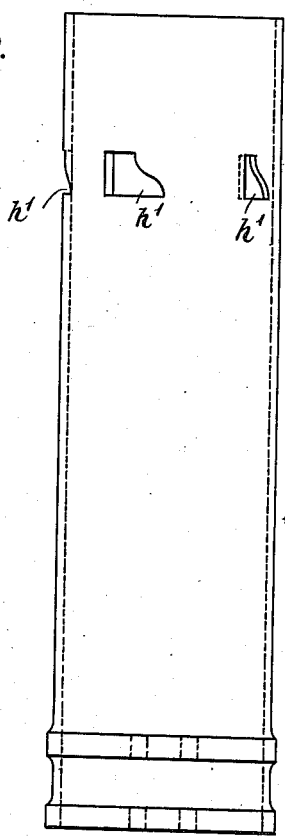
Fig: 12.
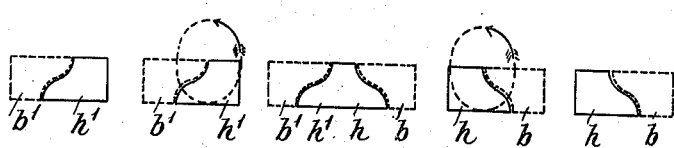
Fig: 13.
WITNESSES
W. P. Burke
John C. Sanders
INVENTOR
Peter Burt
By Thos. Wallace White
ATTY.

UNITED STATES PATENT OFFICE.

PETER BURT, OF BOTHWELL, SCOTLAND, ASSIGNOR OF ONE-HALF TO ARGYLLS LIMITED, OF ALEXANDRIA, SCOTLAND.

INTERNAL-COMBUSTION ENGINE.

1,310,646.      Specification of Letters Patent.      Patented July 22, 1919.

Application filed August 3, 1910. Serial No. 575,254.

*To all whom it may concern:*

Be it known that I, PETER BURT, subject of Great Britain, residing at Bothwell, Lanarkshire, Scotland, have invented new and useful Improvements in Internal-Combustion Engines, of which the following is a specification.

This invention has reference to internal combustion engines and more particularly to that type of such engine wherein the admission and exhaust of the working fluid to and from the cylinder is controlled by a sleeve valve arranged substantially concentric with the cylinder and having ports adapted to register at the proper times with corresponding ports in the said cylinder said sleeve being given by the valve mechanism both reciprocatory and partial rotary or oscillatory movements in order to control the opening and closing of said ports.

The object of the present invention is to simplify the construction of such valve mechanism while at the same time retaining the silence and smoothness of working which are the chief characteristic features of this type of engine.

Accordingly, the invention consists in the combination with the working cylinder and piston of a single sleeve valve independent of the piston and contacting with the surface of the cylinder and mechanism having a single driving connection with the said sleeve for imparting a combined reciprocatory and partial rotary motion to the sleeve relatively to the cylinder and piston, said sleeve being characterized by specially formed ports arranged so that by virtue of the compound movements of the sleeve they each describe an elliptical or eccentric path relatively to the corresponding fixed port in the cylinder, said path, at the part, which in the case of the inlet port, synchronizes with the suction stroke, passing across the cylinder inlet port and which, in the case of the exhaust port, passes across the cylinder exhaust port during the exhaust or scavenging stroke of the engine.

In the accompanying drawings,

Figs. 6, 7, 8 and 9 are similar views to Figs. 2, 3, 4 and 5 showing the corresponding path taken by the exhaust ports in the sleeve relatively to the fixed exhaust ports in the cylinder during the same cycle.

Fig. 10 is a cross sectional view of the engine on the line 2—2 of Figs. 2 and 7.

Figs. 11 and 12 are views of the ported sleeve *per se*, showing the inlet and exhaust ports respectively.

Fig. 13, represents the relative positions of the sleeve and cylinder ports when the exhaust ports are just closing and the inlet ports just opening.

Figure 1:
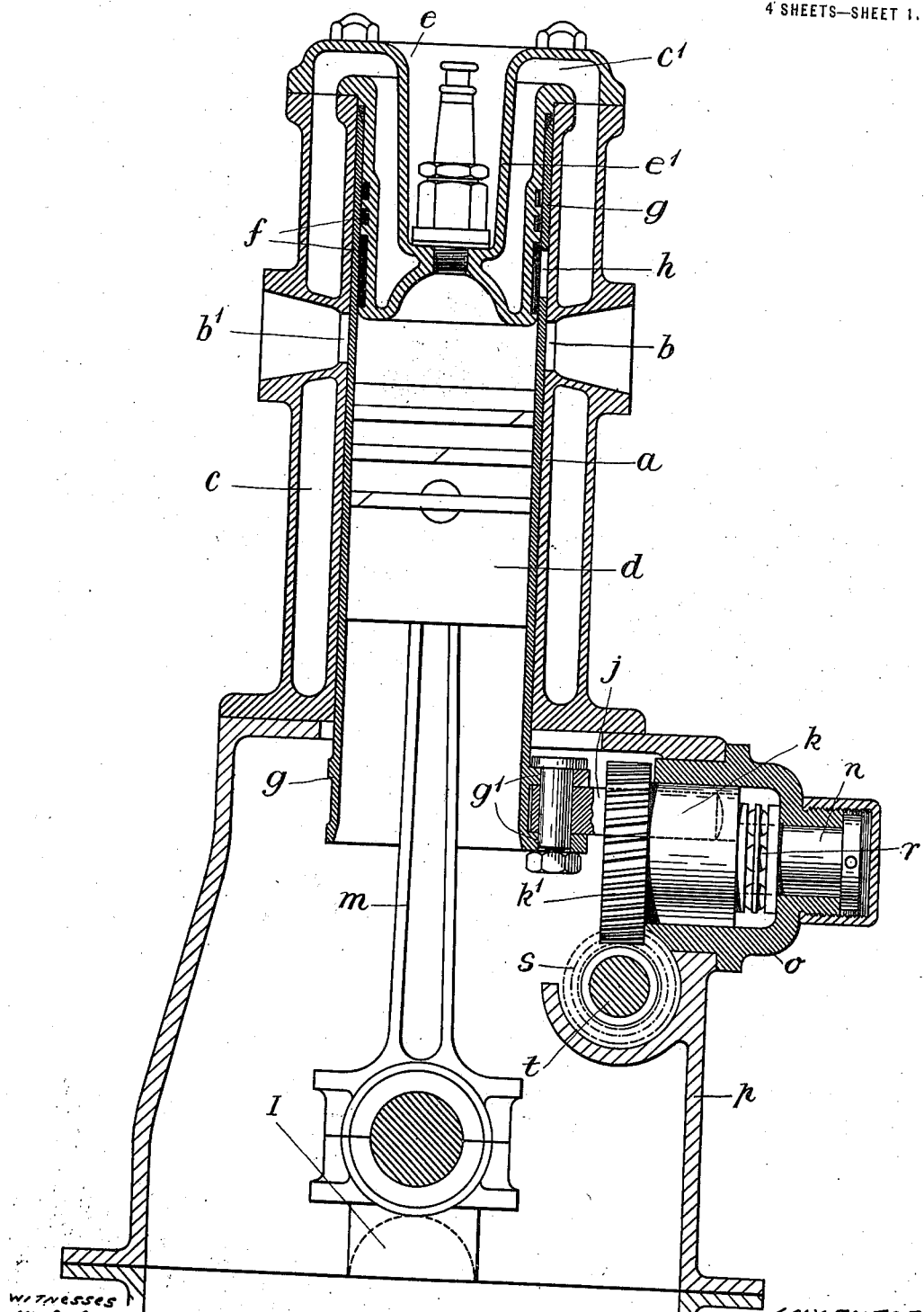
Figure 1, is a longitudinal sectional view of an internal combustion engine constructed according to this invention.

Referring to the drawings, Fig. 1, the working cylinder $a$ is formed with lateral inlet and exhaust ports $b$, $b'$ for the admission of the working fluid and the egress of the burnt gases respectively and may be provided with the usual water jacket $c$ as shown or with cooling flanges.

The upper end of the cylinder is closed by a cap or head $e$ which is firmly bolted to the cylinder and is preferably formed with a water jacket $c'$. The said head is formed with a central portion $e'$ which, as shown, projects a considerable distance into the cylinder for the purpose hereafter explained. The outside diameter of the said central part $e'$ of the head $e$ is made less than the internal diameter of the cylinder by an amount equal or approximately equal to twice the thickness of the sleeve $g$.

This single sleeve $g$ constitutes the valve and is arranged within the cylinder between the latter and the working piston $d$ its upper end fitting within the space left between the central portion $e'$ of the head and the cylinder as above described. In order to provide a gas tight fit for the upper end of the sleeve between the cylinder and head the latter is preferably fitted with piston rings $f$ as clearly shown in Fig. 1.

The sleeve is provided with inlet and exhaust ports $h$, $h'$, respectively corresponding to and adapted to register at the proper times with the fixed inlet and exhaust ports $b$, $b'$ in the cylinder $a$.

The lower end of the sleeve projects a suitable distance into the crank chamber and is at one side provided with a pair of horizontal lugs or ears $g'$.

The compound movement of the sleeve whereby the ports therein are made to register at the proper times with the ports in the cylinder for the purposes above specified is effected by means of the pin *j* which is mounted eccentrically in the boss *k* of the gear wheel *k'* and has its projecting outer end hinged to the ears *q* aforesaid on the lower end of the sleeve.

The arrangement is such that as the gear wheel rotates the pin *j* carried thereby imparts a combined reciprocatory and rotary motion to the sleeve within the cylinder, and the ports *h*, *h'*, in the sleeve are set so that during one complete cycle of the engine they each describe an elliptical or eccentric path (indicated by the arrows in Figs. 2 to 9) relatively to the corresponding ports *b*, *b'* in the cylinder, each said path at the part which in the case of the inlet port synchronizes with the suction stroke of the engine passing across the cylinder inlet port and which in the case of the exhaust port synchronizes with the exhaust or scavenging stroke passing across the cylinder exhaust port.

The boss of said gear wheel is rotatably mounted within a bracket *o* let into the upper part of the crank case *p* and is preferably provided with a ball thrust bearing *r* mounted on a spindle *n* also carried by said bracket.

Rotary motion at half the speed of the crank shaft is imparted to the gear wheel from a worm or skew gear wheel *s* keyed to a shaft *t* which in turn is driven in any suitable manner from the engine crank shaft I.

Figure 2:
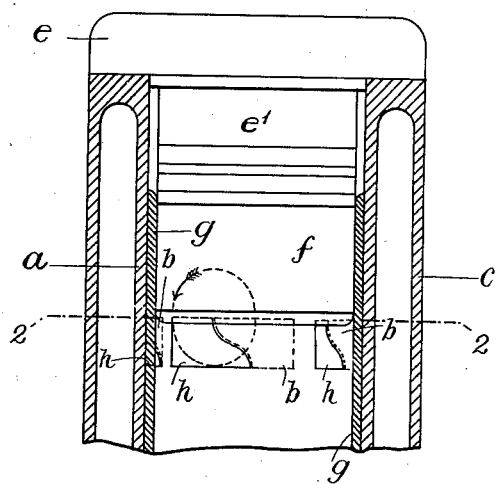
Figs. 2, 3, 4 and 5 are sectional views of a part of the cylinder and sleeve showing the path of the inlet ports in the sleeve relatively to the fixed inlet ports in the cylinder during one cycle of the engine.
Figure 4:
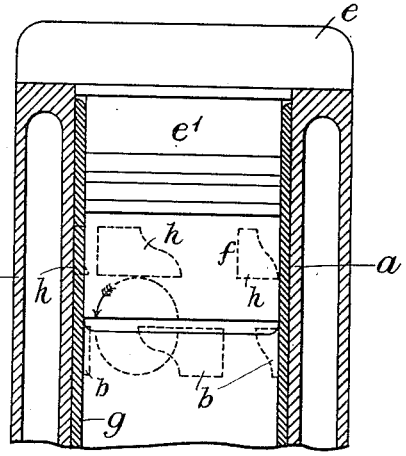

In view of the compound movement of the sleeve it is found necessary in order to give the best possible opening for the inlet and exhaust gases to make the ports in the latter and in the cylinder of the special shape shown in Figs. 2 to 9. For this purpose, as will be seen from the drawings the edges of the inlet and exhaust ports in the cylinder and sleeve which are adjacent to each other immediately prior to the opening and immediately subsequent to the closing of said port respectively as shown in Figs. 2 and 7 are of sinuous form.

The working piston *d* is connected to the main crankshaft I of the engine in the usual manner by the connecting rod *m* and works inside the sleeve *g*.

Owing to the rotating and reciprocating motion of the moving sleeve or liner *g* the ports *h*, *h'* are so arranged to act upon the ports *b* and *b'* in the cylinder *a* that during the latter half of its outstroke, and during the exhaust stroke of the motor piston *d*, the ports *h'* in the sleeve *g* pass over the exhaust ports *b'* in the cylinder *a* thus giving a free passage for the exhaust products, while the inlet ports *h*, *b* are closed. During the first half of the return or instroke of the sleeve *g* the inlet ports *h* in the sleeve *g* pass over the inlet ports *b* in the cylinder *a*, while the exhaust ports *b'*, *h'* are closed, thus giving a free passage for admission of the fresh incoming charge during the suction stroke of the motor piston *d*. Both sets of ports *h*, *h'* in the moving sleeve *g* then pass into the annular space around the projecting head *e'* in the top of the cylinder *a* thus closing all communication through the ports during the compression and firing strokes of the motor piston *d*.

The action of the engine is as follows:

The sleeve or liner *g* travels by means of the combined reciprocative and partial rotative movement imparted by the eccentric pin *j* in the direction shown by the elliptical arrows on Figs. 2 to 9 and 13.

Figure 3:
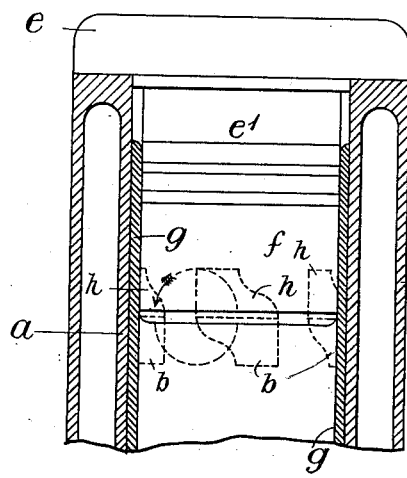
Figure 5:
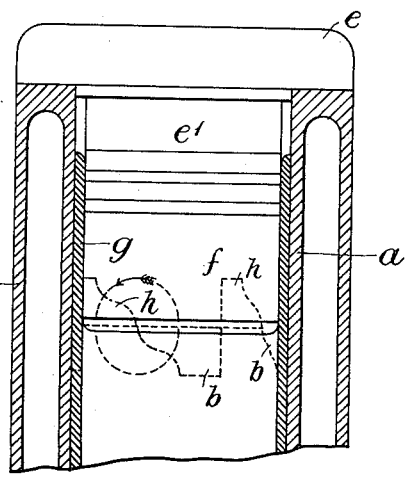

When the ports in the cylinder *a* and in the sleeve or liner *g* are in one horizontal line as shown at Figs. 2, 7 and 13 which is the lowest point of travel of the liner *g* and exhaust ports *b'* in the cylinder as shown at Figs. 7 and 13 have just closed and the inlet ports *b* as shown at Fig. 2 are about to be opened by the uncovering action of the ports *h* in the sleeve *g* to admit the charge for the outward stroke of the piston *d* the sleeve *g* at this moment being about to rise and rotate under the action of the pin *j* to the position shown at Figs. 3 and 8 which it attains during the outward stroke of the piston *d* this stroke of the piston having drawn in the fresh charge. The liner or sleeve *g* continues its travel upward into the annular space before mentioned, then attaining the position shown at Figs. 1, 4 and 9 thus closing all communication between the ports *b* and *h* and *b'* and *h'* while the piston *d* as shown at Fig. 1, also traveling upward, compresses the charge drawn in on its outward stroke. The charge being now ignited, the piston *d* is propelled outward and the sleeve *g* also traveling outward at the end of the piston's outward stroke attains the position shown at Figs. 5 and 6 and commences to open to each other the exhaust ports *b' h'* in the cylinder *a* and sleeve *g* respectively. The piston *d* now returning upward expels the exhaust gases through the ports *h'* in the sleeve *g* and ports *b'* in the cylinder *a* and when the sleeve *g* has attained the position shown at Figs. 2 and 7 respectively another cycle of the engine is about to be commenced.

It will be noted that, as is clearly shown in Fig. 13, there are an even number of inlet and exhaust ports in the cylinder but the valve is formed with an odd number of ports, one of which is adapted to coöperate successively with an exhaust and an inlet port in the cylinder. The diagram in Fig. 13 shows the position of the odd port at the point of closing one cylinder exhaust port and opening the adjacent inlet port. This double use of one of the valve ports permits its two coöperating ports in the cylinder to be located close together and thus economizes circumferential space and permits a maximum port area within the limit of the circumference of the cylinder.

The above described construction, combination and arrangement of a cylinder *a* provided with suitably formed ports *b*, *b'* a liner or sleeve *g* provided with similarly formed ports *h*, *h'* and actuated by means such as described with reference to Fig. 1 on the two to one shaft, or driven by other suitable means from the crank shaft I to give a combined reciprocating and partial rotating motion to the sleeve or liner *g*, and a cylinder head *e* between which and the interior of the engine cylinder *a* the said sleeve *g* works, provides an engine of extreme simplicity, efficient in action, and practically noiseless.

From the foregoing it will be obvious that the invention is equally applicable to an engine in which the explosive part of the charge is injected periodically instead of being sucked in with the fresh air by the action of the piston, and that without any alteration or modification whatsoever of the working parts as described, and also that this particular form of valve sleeve, while only shown and described as applied to a single acting single cylinder engine, is equally applicable to a double acting engine or to a multiple cylinder engine working on the four stroke cycle.

What I claim and desire to secure by Letters Patent of the United States is:—

1. In an internal combustion engine the combination with the cylinder and piston of a ported cylindrical sleeve valve independent of the piston and contacting with the surface of the cylinder and mechanism having a single driving connection with the said sleeve for imparting thereto a combined reciprocatory and partial rotary motion relatively to the cylinder substantially as and for the purposes described.

2. The combination in an internal combustion engine of a cylinder having inlet and exhaust ports, a head or cap projecting into said cylinder, a piston working in said cylinder, a ported sleeve or liner located between the piston and cylinder and having movement relatively to said piston with one end of said sleeve working between the said head and cylinder, a crank shaft driven by said piston and means operated from said crank shaft and having a single driving connection with the sleeve for imparting a combined reciprocatory and partial rotary or oscillating movement to the sleeve within the cylinder for the purpose of controlling the inlet and exhaust ports in the latter, substantially as described.

3. The combination in an internal combustion engine of a cylinder, a head or cap projecting into said cylinder, a piston, a ported sleeve or liner located between the piston and cylinder, a pin jointed to said sleeve and means for actuating said pin so as to impart a combined reciprocatory and partial rotary motion to said sleeve substantially as herein described.

4. The combination in an internal combustion engine working on a four stroke cycle, of a cylinder having inlet and exhaust ports, a head or cap projecting into and closing the outer end of said cylinder and provided with piston rings, a piston, a sleeve or liner located between said piston and cylinder with its upper end passing between the said head and cylinder and having inlet and exhaust ports corresponding to and adapted to register at the proper times with the inlet and exhaust ports in the cylinder, a pin carried eccentrically by a rotating wheel and adapted to impart a combined reciprocatory and partial rotary motion to said sleeve, and means for driving said wheel at half the speed of the crankshaft substantially as herein described.

5. The combination in an internal combustion engine working on a four stroke cycle of a cylinder having inlet and exhaust ports, a piston, a sleeve coaxial with the cylinder and having ports adapted to register at the proper times with the cylinder ports the edges of said inlet and exhaust ports in the cylinder and sleeve which are adjacent to each other immediately prior to the opening and immediately subsequent to the closing of said ports respectively being of sinuous form, and means for actuating said sleeve so that the ports therein describe an approximately elliptical path relatively to the fixed inlet and exhaust ports in the cylinder once during a complete cycle of the engine substantially as herein described.

6. The combination in an internal combustion engine, working on a four stroke cycle of a cylinder having lateral inlet and exhaust ports, a head projecting into and closing the outer end of said cylinder, a piston reciprocating within said cylinder, a sleeve or liner located between said piston and cylinder with its upper end working between the said head and cylinder and having ports adapted to register at the proper times with the cylinder ports, a rotating wheel, a pin eccentrically carried thereby and connected to said sleeve and means for rotating the said wheel so as to cause said pin to impart a combined reciprocating and partial rotary motion to the sleeve so as to give the sleeve ports an approximately elliptical path relatively to the cylinder ports once during each complete cycle of the engine substantially as herein described.

7. In an internal combustion engine, a main cylinder, a single valving sleeve located and working within said main cylinder, and adapted for performing its valving functions by a compound motion, a piston working within but moving independently of the valving sleeve, and an actuating means for imparting motion to the valving sleeve laterally and longitudinally.

8. A four-cycle engine valve system, comprising a main cylinder having inlet and outlet ports located substantially in the same plane, at right angles to the axis of the sleeve and near its head, a separately movable valving cylinder having ports that coact with the main sleeve ports, a piston moving within the valving sleeve, means for oscillating said valving cylinder with less than semi-rotation, to carry the ports into and out of registry laterally, and means for reciprocating said valving-sleeve with a stroke less than the stroke of the piston to carry said ports into and out of alinement longitudinally, for controlling the admission, compression, retention during explosion, and final expulsion of the working medium.

9. In an internal combustion engine, a cylinder having inlet and exhaust ports arranged in substantially the same plane, and a ported cylindrical valve operated to move the valve ports in a substantially circular path on the surface of the cylinder to control the inlet and exhaust ports, said valve having one of its ports adapted to coöperate successively with one of the cylinder exhaust ports and one of the cylinder inlet ports.

10. An internal combustion engine comprising a cylinder having exhaust and inlet passages on opposite sides thereof separated by radial walls, two ports adjacent to one of said radial walls communicating respectively with said exhaust and inlet passages, a valve sleeve coaxial with the cylinder and having a port adapted to coöperate successively with said exhaust and inlet ports in the cylinder, and means for operating the valve sleeve to move its port in a substantially circular path on the surface of the cylinder.

11. In a mechanism for controlling the ingress and egress of the working medium in an internal combustion engine; the combination with the ingress and egress conduits, of a valve-seat cylinder and a single valving cylinder working therein, itself forming a working cylinder for a piston reciprocatively moving therein, said cylinders having ports relatively positioned to alternately aline radially by oscillating movement, and to pass into and out of alinement longitudinally by reciprocating movement, whereby the conduits will be opened consecutively for egress and ingress, and will be closed during compression and explosion; and means for imparting to said valving cylinder simultaneously, both endwise reciprocating and rotary oscillating movement.

12. A mechanism for the purpose specified, comprising a main cylinder having intake and outlet ports near its head, a piston-inclosing cylinder movably fitting within said main cylinder to act as a valve, and having intake and outlet ports, and movable for bringing the respective ports into alternating registering relation therewith, a piston reciprocating within said inclosing cylinder, and means for imparting synchronous longitudinally reciprocating and oscillating movement to said piston-inclosing cylinder, the range of longitudinal movement being less than the piston movement and greater than the longitudinal dimension of the ports.

13. The combination with a cylinder of an internal combustion engine having inlet and exhaust ports, of a sleeve in axial coincidence with said cylinder and having ports adapted to register with said ports of the cylinder, an eccentric longitudinal projection on said sleeve, a crank having its axis substantially perpendicular to the axis of the sleeve, means pivotally connecting said crank to said projection, and means for turning said crank.

14. The combination with a cylinder of an internal combustion engine having inlet and exhaust ports, of a sleeve in axial coincidence with said cylinder and having ports adapted to register with said ports of the cylinder, a pin projecting eccentrically and longitudinally from said sleeve, a rotary member having its axis substantially perpendicular to the axis of the sleeve, and a crank pin connecting said rotary member and pin and having a sliding engagement with one of said parts.

In testimony whereof I have signed my name to this specification in the presence of two subscribing witnesses.

PETER BURT.

Witnesses:
ALLAN W. GEMMILL,
ADAM DICKIE.